United States Patent
Hwang et al.

(10) Patent No.: US 10,227,501 B2
(45) Date of Patent: Mar. 12, 2019

(54) UV-CURABLE HARD COATING COMPOSITION AND COATED ARTICLE USING THE SAME

(71) Applicants: Hyundai Motor Company, Seoul (KR); NOROO BEE CHEMICAL CO., LTD., Cheonan-si (KR)

(72) Inventors: Duck Hyoung Hwang, Seoul (KR); Young Hee Jung, Cheonan-si (KR); Yong Mo Sung, Cheonan-si (KR); Jae Beom Ahn, Anyang-si (KR)

(73) Assignees: Hyundai Motor Company, Seoul (KR); NOROO BEE CHEMICAL CO., LTD., Cheonan-si (KR)

( * ) Notice: Subject to any disclaimer, the term of this patent is extended or adjusted under 35 U.S.C. 154(b) by 65 days.

(21) Appl. No.: 15/380,917

(22) Filed: Dec. 15, 2016

(65) Prior Publication Data

US 2018/0066155 A1    Mar. 8, 2018

(30) Foreign Application Priority Data

Sep. 6, 2016 (KR) ........................ 10-2016-0114414

(51) Int. Cl.
| | | |
|---|---|---|
| C09D 135/02 | (2006.01) | |
| C09D 7/48 | (2018.01) | |
| C09D 7/47 | (2018.01) | |
| C08K 5/00 | (2006.01) | |

(52) U.S. Cl.
CPC ............ *C09D 135/02* (2013.01); *C09D 7/47* (2018.01); *C09D 7/48* (2018.01); *C08K 5/005* (2013.01)

(58) Field of Classification Search
CPC .......... C09D 135/02; C09D 7/48; C09D 7/47; C08K 5/005
See application file for complete search history.

(56) References Cited

U.S. PATENT DOCUMENTS 8,754,145 B1 *  6/2014  Haubrich ............. C09D 133/08
                                                                    522/6

FOREIGN PATENT DOCUMENTS

| JP | 2012-140516 A | 7/2012 |
|---|---|---|
| KR | 10-2011-0050952 A | 5/2011 |
| KR | 10-2014-0141109 A | 12/2014 |
| KR | 10-2015-0097569 A | 8/2015 |

* cited by examiner

*Primary Examiner* — Sanza L. McClendon
(74) *Attorney, Agent, or Firm* — Morgan, Lewis & Bockius LLP

(57) ABSTRACT

A UV-curable hard coating composition and a coated article coated with the coating composition are provided herein. The UV-curable hard coating composition can be coated on a plastic material such as polycarbonate to form a coated film having excellent material adhesion, abrasion resistance, and weather resistance. The coating composition may be coated by a general coating method. In some instances, inorganic particles as a coating component are not included in the coating composition. Few foreign substances are generated during spray-coating using the composition. The coating composition can be easily stored. Also, the coated article can be polished or recoated with the UV-curable hard coating composition if needed.

10 Claims, 1 Drawing Sheet

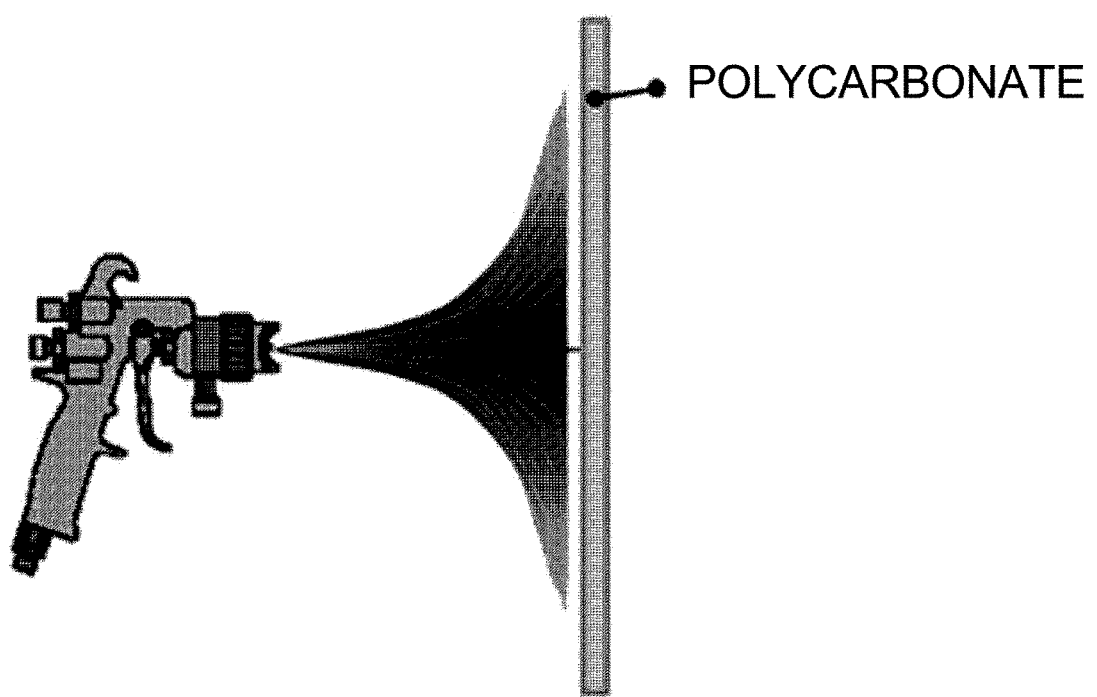

UV-CURABLE HARD COATING COMPOSITION AND COATED ARTICLE USING THE SAME

CROSS-REFERENCE TO RELATED APPLICATION

This application claims under 35 U.S.C. § 119(a) the benefit of Korean Application No. 10-2016-0114414, filed on Sep. 6, 2016, the entire contents of which are incorporated herein by reference for all purposes.

BACKGROUND

Technical Field

The present disclosure relates to a UV-curable hard coating composition which can be coated on a plastic material such as polycarbonate to form a coated film having excellent material adhesion, abrasion resistance, and weather resistance. The present disclosure also includes a coated article coated with the coating composition.

Background Art

In the field of automobile technology, components made of plastics instead of glass have been developed to improve vehicle weight reduction and fuel efficiency. For instance, a headlamp lens has been made of a polycarbonate material instead of glass, and more recently, polycarbonate has been used in vehicle components such as sunroof, quarter glass, and rear glass. However, since the sunroof, the quarter glass, the rear glass, and the like have relatively large areas and play an important role in the vehicle exterior, scratches on the polycarbonate and caused by, for example, car washing have been an issue. For instance, a clear view through the rear glass is important for safe driving, and thus enhanced abrasion resistance and weather resistance of plastic components are needed.

In order to satisfy this need, various hard coating materials for plastics are under development. However, coatings described in the prior art such as a heat-curable coating material require a curing time of about 1 hour at 120° C. or higher. In some cases, an inorganic filler is included in the coating material. Other problems associated with the hard coating materials described in the prior include: generating of foreign substances during spray coating, inability to polish and recoat the hard coating material after the initial coating, and a low production yield.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

An aspect of the present invention is to provide a UV-curable hard coating composition which can be coated on a plastic material such as polycarbonate to improve abrasion resistance and weather resistance, to enable polishing and recoating, and to to improve production yield.

Another aspect of the present invention is to provide a coated article on which the UV-curable hard coating composition is coated.

In one aspect, the present invention provides a UV-curable hard coating composition comprising:
(I) a resin component comprising:
(A) from about 25 to 30 wt % of urethane acrylate oligomer having 5 to 6 polymerizable unsaturated groups;
(B) from about 5 to 12 wt % of acrylate monomer-1 having 3 to 6 polymerizable unsaturated groups;
(C) from about 3 to 7 wt % of acrylate monomer-2 having 2 polymerizable unsaturated groups; and
(D) from about 1 to 5 wt % of an acryl resin having a glass transition temperature of from about 60 to 110° C.;
(II) additives comprising: from about 1 to 5 wt % of a photoinitiator, from about 1 to 5 wt % of a UV stabilizer, and from about 0.1 to 0.5 wt % of a leveling agent; and
(III) from about 45 to 55 wt % of an organic solvent.

In another aspect, the present invention provides a coated article on which the coating composition is coated.

According to the present invention, the coating composition can be coated by general coating methods, for example, various methods such as spray coating, dip coating, and flow coating. Particularly, since the coating composition of the present invention does not include inorganic particles, few foreign substances are generated during coating by spray coating and there is no problem in storage of coating materials, and thus it is easy to handle the coating materials.

In the coating composition of the present invention, few foreign substances are generated during coating and polishing or recoating is easy, and thus it is possible to significantly reduce disposal of components due to paint defects.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention.

FIG. 1 is a diagram illustrating a painting process of spray-coating a coating composition of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a UV-curable hard coating composition which is coated on a plastic material such as polycarbonate to form a coated film having excellent material adhesion, abrasion resistance, and weather resistance, and a coated article on which the coating composition is coated.

Respective components configuring the UV-curable hard coating composition according to the present invention and a composition ratio thereof will be described below in detail.

(I) Resin Component

In the present invention, the resin component includes (A) from about 25 to 30 wt % (e.g., about 25 wt %, 26, 27, 28, 29, or about 30 wt %) of urethane acrylate oligomer having five to six polymerizable unsaturated groups; (B) from about 5 to 12 wt % (e.g., about 5 wt %, 6, 7, 8, 9, 10, 11 or about 12 wt %) of acrylate monomer-1 having three to six polymerizable unsaturated groups; (C) from about 3 to 7 wt % (e.g., about 3 wt %, 4, 5, 6, or about 7 wt %) of acrylate monomer-2 having two polymerizable unsaturated groups; and (D) from about 1 to 5 wt % (e.g., about 1 wt %, 2, 3, 4, or about 5 wt %) of an acryl resin having a glass transition temperature of from about 60 to 110° C. (e.g., about 60° C., 65, 70, 75, 80, 85, 90, 95, 100, 105, or about 110° C.).

Urethane Acrylate Oligomer

The coating composition of the present invention includes urethane acrylate oligomer as the resin component. The urethane acrylate oligomer has 5 to 6 polymerizable unsaturated groups and a weight average molecular weight is in a range of from about 800 to 2,000 g/mol (e.g., about 800 g/mol, 900, 1000, 1100, 1200, 1300, 1400, 1500, 1600, 1700, 1800, 1900, or about 2000 g/mol). By containing the urethane acrylate oligomer, a coated film has a tough property and as a result, in terms of abrasion resistance, a desired effect can be expected. In the present invention, the urethane acrylate oligomer may use EB1290, UP118, and EB5129 by ENTIS Co., Ltd., RA6800 by Mitsui Co., Ltd., PU610 by Miwon Co., Ltd., Etercure6145-100 by ETERNAL Co., Ltd., and the like as commercial products.

The urethane acrylate oligomer may be included in a range of from about 25 to 30 wt % (e.g., about 25 wt %, 26, 27, 28, 29, or about 30 wt %) of the coating composition of the present invention. When the content thereof is less than 25 wt %, abrasion resistance may deteriorate, and when the content thereof is greater than 30 wt %, deterioration of adhesion and releasing after weathering may occur.

Acrylate Monomer-1

The coating composition of the present invention includes multi-functional acrylate monomer as the resin component and includes acrylate monomer-1 and monomer-2 divided according to the number of polymerizable unsaturated groups in the monomer.

The acrylate monomer-1 may be a polyalcohol acrylate compound having from 3 to 6 polymerizable unsaturated groups, and preferably a polyalcohol acrylate compound having 3 to 4 polymerizable unsaturated groups. The acrylate monomer-1 serves to improve surface hardness and curing density of the coated film. In some embodiments, the acrylate monomer-1 includes at least one selected from a group consisting of trimethylolpropane triacrylate, pentaerythritol triacrylate, pentaerythritol tetraacrylate, dipentaerythritol pentaacrylate and dipentaerythritol hexaacrylate.

The acrylate monomer-1 may be included in a range of from about 5 to 12 wt % (e.g., about 5 wt %, 6, 7, 8, 9, 10, 11 or about 12 wt %) of the coating composition of the present invention. When the content thereof is less than 5 wt %, abrasion resistance may be decreased due to deterioration of the curing density, and when the content thereof is greater than 12 wt %, the curing density of the coated film is excessive and thus recoatability may be degraded.

Acrylate Monomer-2

The acrylate monomer-2 is a polyalcohol acrylate compound having 2 polymerizable unsaturated groups. The acrylate monomer-2 serves to improve material adhesion and prevent curing shrinkage of the coated film to prevent releasing after weathering. In some embodiments, the acrylate monomer-2 includes at least one selected from a group consisting of hexanediol diacrylate, tripropylene glycol diacrylate and dimethylol tricyclodecane diacrylate may be used.

The acrylate monomer-2 may be included in a range of from about 3 to 7 wt % (e.g., about 3 wt %, 4, 5, 6, or about 7 wt %) of the coating composition of the present invention. When the content thereof is less than 3 wt %, material adhesion may be weakened, and when the content thereof is greater than 7 wt %, abrasion resistance is decreased and haze may occur by causing material erosion.

Acryl Resin

The coating composition of the present invention includes an acryl resin as the resin component. The acryl resin can have a glass transition temperature (Tg) of from about 60 to 110° C. (e.g., about 60° C., 65, 70, 75, 80, 85, 90, 95, 100, 105, or about 110° C.) and a weight average molecular weight of from about 100,000 to 150,000 g/mol (e.g., about 100,000; 110,000; 120,000; 130,000; 140,000; or about 150,000 g/mol). The acryl resin serves to improve abrasion resistance of the coated film and improve recoatability by preventing curing shrinkage. In some embodiments, the acryl resin can be Paraloid A-11 (Tg 100° C.), Paraloid A-21 (Tg 105° C.), Paraloid B-44 (Tg 60° C.), and the like by ROHM & HASS Corporation.

The acryl resin may be included in a range of from about 1 to 5 wt % (e.g., about 1 wt %, 2, 3, 4, or about 5 wt %) of the coating composition of the present invention. When the content thereof is less than 1 wt %, an effect of improving the recoatability is slight and when the content thereof is greater than 5 wt %, paint workability is degraded and thus orange peel may occur.

Additives

The coating composition of the present invention includes (E) from about 1 to 5 wt % (e.g., about 1 wt %, 2, 3, 4, or about 5 wt %) of a photoinitiator, (F) from about 1 to 5 wt % (e.g., about 1 wt %, 2, 3, 4, or about 5 wt %) of a UV stabilizer, and (G) from about 0.1 to 0.5 wt % (e.g., about 0.1 wt %, 0.2, 0.3, 0.4, or about 0.5 wt %) of a leveling agent as additives.

Photoinitiator

The coating composition of the present invention includes a photoinitiator capable of inducing radical polymerization as the additives. That is, a photoinitiator capable of inducing polymerization of the urethane acrylate oligomer and the acrylate monomer included as the resin component can be included. In some embodiments, the photoinitiator can include a short-wavelength initiator having an absorption wavelength area of from about 220 to 280 nm (e.g., about 220 nm 225, 230, 235, 240, 245 250, 255, 260, 265, 270, 275 or about 280 nm) and/or a long-wavelength initiator having an absorption wavelength area of from about 300 to 420 nm (e.g., about 300 nm 305, 310, 315, 320, 325, 330, 335, 340, 345, 350, 355, 360, 365, 370, 375, 380, 385, 390, 395, 400, 405, 410, 415, or about 420 nm) may be used. In certain embodiments, the photoinitiator is used by combining the short-wavelength initiator and the long-wavelength initiator. In some instances, the photoinitiator is used by combining the short-wavelength initiator and the long-wavelength initiator with a weight ratio of from about 2 to 4:1. In some embodiments, the weight ratio is from about 2:1, 2.5:1, 3:1, 3.5:1, 4:1, or the like. In certain instances, the photoinitiator is used by combining the short-wavelength initiator and the long-wavelength initiator with a weight ratio of from about 3:1.

The short-wavelength initiator can be 2-hydroxy-2-methyl-1-phenyl-propan-1-one, 1-hydroxy-cyclohexyl-phenyl-ketone, 2-hydroxy-1-{4-[4-(2-hydroxy-2-methyl-propionyl)-benzyl]-phenyl}-2-methyl-propan-1-one, methyl benzoyl formate, and the like may be used. As the long-wavelength initiator, 2,4,6-trimethylbenzoyldiphenylphosphine oxide, bis(2,4,6-trimethylbenzoyl)-phenylphosphine oxide, and the like.

The photoinitiator may be included in a range of from about 1 to 5 wt % (e.g., about 1 wt %, 2, 3, 4, or about 5 wt %) of the coating composition of the present invention. When the content thereof is less than 1 wt %, curing efficiency is decreased and thus adhesion and abrasion resistance may deteriorate, and when the content thereof is greater than 5 wt %, the photoinitiator is excessively used and thus rise in costs is caused.

UV Stabilizer

The coating composition of the present invention includes a UV stabilizer as an additive. In some embodiments the UV stabilizer can be a UV absorber capable of preventing deterioration of adhesion after weathering and yellowing and/or hindered amine-based light stabilizer capable of preventing loss of gloss, cracks, choking, or the like. In some embodiments, the UV stabilizer is used by combining the UV absorber and the hindered amine-based light stabilizer. In certain embodiments, the UV stabilizer is used by combining the UV absorber and the hindered amine-based light stabilizer with a weight ratio of from about 1 to 3:1. In some embodiments, the weight ratio is from about 1:1, 2:1, 3.1, or the like. In other embodiments, the UV stabilizer is used by combining the UV absorber and the hindered amine-based light stabilizer with a weight ratio of 2:1.

In some embodiments, the UV absorbercan include, benzotriazols such as, but not limited to, 2-(2H-benzotriazol-2-yl)-4,6-ditert-pentylphenol, 2-(2H-benzotriazol-2-yl)-6-(1-methyl-1-phenylethyl)-4-(1,1,3,3-tetramethylbutyl)phenol, and the like; triazines including 2-[4-[(2-hydroxy-3-dodesiloxypropyl)oxy]-2-hydroxyphenyl]-4,6-bis (2,4-dimethylphenyl)-1,3,5-triazine, 2-[4-[(2-hydroxy-3-tridesiloxypropyl)oxy]-2-hydroxyphenyl]-4,6-bis(2,4-dimethylphenyl) 1,3,5-triazine, and the like. Triazine-based UV absorbers having excellent weather resistance may be used.

In some embodiments the hindered amine-based light stabilizer includes, but is not limited to, bis(1,2,2,6,6-pentamethyl-4-piperidyl)sebacate, 2,4-bis[N-butyl-N-(1-cyclohexyloxy-2,2,6,6-tetramethylpiperidine-4-yl)amino]-6-(2-hydroxyethylamine)-1,3,5-triazine, and the like.

The UV stabilizer may be included in a range of from about 1 to 5 wt % (e.g., about 1 wt %, 2, 3, 4, or about 5 wt %) of the coating composition of the present invention. When the content thereof is less than 1 wt %, weather resistance due to UV and the like is vulnerable and appearance degradation such as yellowing, cracks, and releasing may occur, and when the content thereof is greater than 5 wt %, degradation of properties due to deterioration of curing efficiency may be caused by interrupting the radical formation of the photoinitiator.

Leveling Agent

The coating composition of the present invention can include a leveling agent as a additive. In some embodiments, the leveling agent may be selected and used, in which the effect of lowering the surface tension is increased, substrate wettability is good, and a surface slip property may be minimized not to influence recoatability. In the case of satisfying these conditions, silicon-based leveling agents, acryl-based leveling agents, and the like may be used without limitation. In the present invention, commercial leveling agents such as, but not limited to, BYK310, BYK306, and the like may be used as a silicon-based leveling agent and BYK355, BYK358, and the like may be used as an acryl-based leveling agent.

The leveling agent may be included in a range of from about 0.1 to 0.5 wt % (e.g., about 0.1 wt %, 0.2, 0.3, 0.4, or about 0.5 wt %) of the coating composition of the present invention. When the content thereof is less than 0.1 wt %, an effect of the leveling agent is not enough and thus appearance degradation such as orange peel may occur, and when the content thereof is greater than 0.5 wt %, interlayer adhesion of the recoating system may be decreased.

Organic Solvent

The coating composition of the present invention includes an organic solvent for improving workability by adjusting viscosity of the coating material and ensuring recoatability. Preferably, a resin component does not move in a wet state on the coating surface during recoating by selecting and using an organic solvent of which substrate wettability is good and a volatilization speed is rapid to improve recoatability.

The present invention is not particularly limited to the selection of the organic solvent used in the present invention, and at least one selected from a group consisting of alcohols, ethers, esters, and ketones may be used. In some embodiments, a solvent that does not erode the plastic material during coating is used, and in some instances, alcohol-based or ether-based solvents such as ethyl alcohol, isopropyl alcohol, n-butanol, isobutanol, and propylene glycol monomethyl ether are used. Further, in certain cases, a solvent which may cause the erosion of the plastic material, but does not have a large effect during actual coating due to the rapid volatilization speed is used, and for instance, ester-based or ketone-based solvents such as ethyl acetate, butyl acetate, and methyl ethyl ketone are used. Further, in some embodiments, the solvent is used by combining the organic solvents.

The organic solvent may be included in a range of from about 45 to 55 wt % (e.g., about 45, 46, 47, 48, 49, 50, 51, 52, 53, 54, or about 55 wt %) of the coating composition of the present invention. When the content thereof is less than 45 wt %, the viscosity of the coating material is increased and thus the workability deteriorates, and when the content thereof is greater than 55 wt %, the viscosity is decreased and thus sagging may occur during coating.

A method for preparing the UV-curable hard coating composition according to the present invention is not particularly limited. For example, after (D) the acryl resin is added and dissolved in (H) the organic solvent, (E) the photoinitiator and (F) the UV stabilizer are added and sufficiently stirred, (A) the urethane acrylate oligomer, (B) the acrylate monomer-1 and (C) the acrylate monomer-2 are added therein and sufficiently stirred, and thereafter, finally, (G) the leveling agent is added and stirred to prepare the coating composition of the present invention.

The UV-curable hard coating composition according to the present invention is coated on the plastic material such as polycarbonate to form a coated film having excellent material adhesion, abrasion resistance, and weather resistance. Accordingly, a coated article on which the UV-curable hard coating composition according to the present invention is coated and cured can maintain durability of the coated film even under a harsh outdoor condition and particularly, the UV-curable hard coating composition is useful as a coating material for coating a transparent material such as a transparent plastic lens.

The present invention is not particularly limited to a method for coating or curing the coating composition. The coating method may use for example, spray coating, dip coating, flow coating, spin coating, and the like, which are widely used in the art, but is not limited thereto. However, the coating composition of the present invention does not include inorganic particles to be useful for applying spray coating.

As described above, the present invention will be described in more detail based on the following Examples and the present invention is not limited thereto.

EXAMPLES

The following examples illustrate the invention and are not intended to limit the same.

Examples 1 to 3 and Comparative Examples 1 to 7: Preparation of UV-Curable Coating Composition As a composition illustrated in Table 1 below, a UV-curable coating composition was prepared by the following method for preparing a coating material, respectively.

That is, an organic solvent H was added in a prepared container and stirred and a powder acryl resin D was added and dissolved. Thereafter, a photoinitiator E and a UV stabilizer F were added, sufficiently stirred, and then dissolved. After it was verified that the mixture was sufficiently dissolved, urethane acrylate oligomer A, acrylate monomer-1 B, and acrylate monomer-2 C were added and sufficiently stirred for 10 minutes or more. Finally, while stirring, a leveling agent G was added and sufficiently stirred for 10 minutes or more to prepare the coating material.

Raw materials used in Table 1 below are as follows.

(A) Urethane acrylate oligomer

A-1: EB-1290 by ENTIS Co., Ltd. and urethane acrylate oligomer having 5 to 6 unsaturated groups and a weight average molecular weight of 1,000 g/mol A-2: UP-118 by ENTIS Co., Ltd. and urethane acrylate oligomer having 5 to 6 unsaturated groups and a weight average molecular weight of 1,000 g/mol (B) Acrylate monomer-1

B-1: Pentaerythritol triacrylate

B-2: Trimethylolpropane triacrylate (C) Acrylate monomer-2

C: Hexanediol diacrylate (D) Acryl resin

D: Paraloid B-44 by ROHM & HASS Co., Ltd., methyl methacrylate (MMA) copolymer, weight average molecular weight of 140,000 g/mol, and glass transition temperature of 60° C.

(E) Photoinitiator

E-1: Irgacure1173 by BASF Co., Ltd., 2-hydroxy-2-methyl-1-phenyl-ketone, and absorption wavelength of 220 to 280 nm E-2: Irgacure819 by BASF Co., Ltd., Bis(2,4,6-trimethylbenzoyl)-phenylphosphine oxide, and absorption wavelength of 280 to 400 nm (F) UV stabilizer F-1: Tinuvin 479 by BASF Co., Ltd., triazine-based UV absorber F-2: Tinuvin 292 by BASF Co., Ltd., hindered amine-based light stabilizer (G) Leveling agent G: BYK-310 by BYK Co., Ltd., silicon-based leveling agent (H) Organic solvent H-1: Ethylacetate H-2: Propylene glycol monomethyl ether

TABLE 1

| Classification | | Example | | | Comparative Example | | | | | | |
|---|---|---|---|---|---|---|---|---|---|---|---|
| | | 1 | 2 | 3 | 1 | 2 | 3 | 4 | 5 | 6 | 7 |
| A (wt %) | A-1 | 27 | 27 | 0 | 22 | 25 | 25 | 30 | 27 | 25 | 27 |
| | A-2 | 0 | 0 | 27 | 0 | 0 | 0 | 0 | 0 | 0 | 0 |
| B (wt %) | B-1 | 9 | 5 | 9 | 12 | 13 | 6 | 9 | 9 | 8 | 9 |
| | B-2 | 0 | 4 | 0 | 0 | 0 | 0 | 0 | 0 | 0 | 0 |
| C (wt %) | | 5 | 5 | 5 | 7 | 3 | 10 | 5 | 5 | 5 | 5 |
| D (wt %) | | 3 | 3 | 3 | 3 | 3 | 3 | 0 | 3 | 3 | 3 |
| E (wt %) | E-1 | 2.1 | 2.1 | 2.1 | 2.1 | 2.1 | 2.1 | 2.1 | 2.8 | 2.1 | 2.1 |
| | E-2 | 0.7 | 0.7 | 0.7 | 0.7 | 0.7 | 0.7 | 0.7 | 0 | 0.7 | 0.7 |
| F (wt %) | F-1 | 2 | 2 | 2 | 2 | 2 | 2 | 2 | 2 | 4 | 2 |
| | F-2 | 1 | 1 | 1 | 1 | 1 | 1 | 1 | 1 | 2 | 1 |
| G (wt %) | | 0.2 | 0.2 | 0.2 | 0.2 | 0.2 | 0.2 | 0.2 | 0.2 | 0.2 | 0.2 |
| H (wt %) | H-1 | 25 | 25 | 25 | 25 | 25 | 25 | 25 | 25 | 25 | 0 |
| | H-2 | 25 | 25 | 25 | 25 | 25 | 25 | 25 | 25 | 25 | 50 |
| Total content (wt %) | | 100 | 100 | 100 | 100 | 100 | 100 | 100 | 100 | 100 | 100 |

Comparative Example 8

Application of heat-curable hard coating material for PC glazing in the related art (AS4700 by Momentive Co., Ltd.)

Comparative Example 9

Application of UV hard coating material for head lamp (equivalent product in Korean Patent Application Publication No. 10-2011-0050952)

TEST EXAMPLES

The UV-curable hard coating composition prepared in Examples 1 to 3 and Comparative Examples 1 to 9 was spray-coated on a polycarbonate sheet with a thickness of 15 to 20 μm. The UV-curable hard coating composition was left for 1 minute at room temperature and for 5 minutes at 65° C. to volatilize an initial solvent, and then UV rays were irradiated with a dosage of 250 mW/cm$^2$ and 3,000 mJ/cm$^2$ based on UVA to manufacture a coated article. In the case, as the used polycarbonate sheet, Makrolon AG2677 by Bayer Corporation was used.

A performance evaluation of the manufactured coated article was performed by the following method and the result thereof was illustrated in Table 2 below.

[Performance Evaluation Method of Coated Article]

Appearance: Whether there is no haze in an appearance of the coated film was observed with naked eyes.

Adhesion: After crosscutting of 10λ10 2 mm, tapping was performed with a tape and releasing was observed.

Abrasion resistance: Abrasion was performed 500 times by an abrasion wheel of CS-10F and a load of 500 g by using a Taber abrasor and then haze was measured. A difference between an initial haze value and a haze value after an abrasion resistance test was calculated and the value was represented by $\Delta Hz_{500}$. It was evaluated that $\Delta Hz_{500}$ of 10% or less was good.

Accelerated weathering: After 5000 KJ/m$^3$ was irradiated with illuminance of 0.75±0.02 W/(m2·nm)) [340 nm] by using WEATHER-O-METER, a color variation ΔE was measured by using a color shift system. It was evaluated that ΔE of 2 or less was good.

Recoatability: A primary coated article manufactured by the method for manufacturing the coated article was coated and cured again by the same method and then a wet state and adhesion were verified.

the present invention, appearance, adhesion, abrasion resistance, weather resistance, and recoatability all are excellent, and abrasion resistance and recoatability are significantly excellent as compared with a AS4700 hard coating material by Momentive Co., Ltd. (Comparative Example 8) or prior application invention (Comparative Example 9).

On the other hand, in Comparative Example 1, a coated film having weak abrasion resistance was prepared due to less than the content of (A) urethane acrylate oligomer. In Comparative Example 2, the curing density of the coated film was excessive due to more than the content of (B) acrylate monomer-1 and thus adhesion after weathering and recoatability were deteriorated. In Comparative Example 3, material erosion was caused due to more than the content of (C) acrylate monomer-2 and thus the haze was generated. In Comparative Example 4, (D) acrylate resin was not included and as a result, recoatability was deteriorated. In Comparative Example 5, curing was not sufficiently performed by using a short-wavelength initiator alone without a long-wavelength initiator as (E) the photoinitiator and thus adhesion and abrasion resistance were deteriorated. In Comparative Example 6, (F) an excessively used UV stabilizer interrupted the radical formation of the photoinitiator to decrease the curing efficiency and thus adhesion and abrasion resistance were deteriorated. In Comparative Example 7, (H) a solvent having a low volatilization speed was used alone and thus the coating material was not dried in an evenly dispersed state during secondary coating but re-aggregated and then poor wetting during recoating was caused.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A UV-curable hard coating composition, comprising:
   (I) a resin component comprising:
      (A) from about 25 to 30 wt % of urethane acrylate oligomer having five to six polymerizable unsaturated groups;
      (B) from about 5 to 12 wt % of acrylate monomer-1 having three to six polymerizable unsaturated groups;

TABLE 2

| Classification | Example | | | Comparative Example | | | | | | | | |
|---|---|---|---|---|---|---|---|---|---|---|---|---|
| Classification | 1 | 2 | 3 | 1 | 2 | 3 | 4 | 5 | 6 | 7 | 8 | 9 |
| Appearance | Transparency | Transparency | Transparency | Transparency | Transparency | Haze | Transparency | Transparency | Transparency | Transparency | Transparency | Transparency |
| Adhesion | Good | Good | Good | Good | Good | Good | Good | Release | Release | Good | Good | Good |
| Abrasion resistance ($\Delta Hz_{500}$) | 7.9% | 8.3% | 9.3% | 15.3% | 7.0% | — | 7.5% | 18.2% | 14.9% | 8.7% | 6.5% | 13.5% |
| Accelerated weathering (ΔE) | 1.77 | 1.83 | 1.52 | 1.88 | Release | — | 1.64 | — | — | 1.91 | 1.72 | 3.04 |
| Recoatability | Good | Good | Good | Good | Release | Good | Poor wetting | — | — | Poor wetting | Release | Release |

* When appearance and adhesion are poor, abrasion resistance, accelerated weathering, and recoatability are not evaluated.

According to the result of Table 2, it can be verified that in the coating compositions in Examples 1 to 3 according to (C) from about 3 to 7 wt % of acrylate monomer-2 having two polymerizable unsaturated groups; and (D) from about 1 to 5 wt % of an acryl resin having a glass transition temperature of from about 60 to 110° C.;

(II) additives comprising: (E) from about 1 to 5 wt % of a photoinitiator, (F) from about 1 to 5 wt % of a UV stabilizer, and (G) from about 0.1 to 0.5 wt % of a leveling agent; and (III) from about 45 to 55 wt % of an organic solvent, wherein the (D) acryl resin has a weight average molecular weight in a range of from about 100,000 to 150,000 g/mol, and wherein the photoinitiator is a mixture of a short-wavelength initiator and a long-wavelength initiator with a weight ratio of from about 2 to 4:1.

2. The UV-curable hard coating composition of claim 1, wherein the (A) urethane acrylate oligomer has a weight average molecular weight in a range of from about 800 to 2,000 g/mol.

3. The UV-curable hard coating composition of claim 1, wherein (B) the acrylate monomer-1 is at least one selected from a group consisting of trimethylolpropane triacrylate, pentaerythritol triacrylate, pentaerythritol tetraacrylate, dipentaerythritol pentaacrylate and dipentaerythritol hexaacrylate.

4. The UV-curable hard coating composition of claim 1, wherein the (C) acrylate monomer-2 is at least one selected from a group consisting of hexanediol diacrylate, tripropylene glycol diacrylate and dimethylol tricyclodecane diacrylate.

5. The UV-curable hard coating composition of claim 1, wherein the photoinitiator is the mixture of the short-wavelength initiator having an absorption wavelength area of from about 220 to 280 nm and the long-wavelength initiator having an absorption wavelength area of from about 300 to 420 nm.

6. The UV-curable hard coating composition of claim 1, wherein the UV stabilizer is a mixture of a UV absorber and a hindered amine-based light stabilizer with a weight ratio of from about 1 to 3:1.

7. The UV-curable hard coating composition of claim 1, wherein the leveling agent is a silicon-based leveling agent, an acryl-based leveling agent, or a mixture thereof.

8. The UV-curable hard coating composition of claim 1, wherein the organic solvent is at least one selected from a group consisting of alcohols, ethers, esters, and ketones.

9. A coated article on which the coating composition of claim 1 is coated.

10. A UV-curable hard coating composition, consisting of:
(I) a resin component comprising:
   (A) from about 25 to 30 wt % of urethane acrylate oligomer having five to six polymerizable unsaturated groups;
   (B) from about 5 to 12 wt % of acrylate monomer-1 having three to six polymerizable unsaturated groups;
   (C) from about 3 to 7 wt % of acrylate monomer-2 having two polymerizable unsaturated groups; and
   (D) from about 1 to 5 wt % of an acryl resin having a glass transition temperature of from about 60 to 110° C.;

(II) additives comprising: (E) from about 1 to 5 wt % of a photoinitiator, (F) from about 1 to 5 wt % of a UV stabilizer, and (G) from about 0.1 to 0.5 wt % of a leveling agent; and (III) from about 45 to 55 wt % of an organic solvent.

* * * * *